United States Patent [19]
Tadic et al.

[11] Patent Number: 5,618,488
[45] Date of Patent: Apr. 8, 1997

[54] METHOD OF MANUFACTURING A SEAL FOR A ROLLER BEARING

[75] Inventors: Vendran A. Tadic, Elst; Johan C. M. Bras, Tricht, both of Netherlands

[73] Assignee: SKF Industrial Trading & Development Company B.V., Netherlands

[21] Appl. No.: 297,452

[22] Filed: Aug. 29, 1994

[30] Foreign Application Priority Data

Sep. 16, 1993 [NL] Netherlands ............................ 9301601

[51] Int. Cl.$^6$ .................................................. B29C 45/00
[52] U.S. Cl. ........................................... 264/478; 264/494
[58] Field of Search ................................... 264/494, 496, 264/478, 488, 485

[56] References Cited

U.S. PATENT DOCUMENTS

| | | | |
|---|---|---|---|
| 3,053,742 | 9/1962 | Smith | 264/488 |
| 3,700,296 | 10/1972 | Bugmann . | |
| 3,957,278 | 5/1976 | Rabe . | |
| 4,049,757 | 9/1977 | Kammel et al. | 264/485 |
| 4,191,158 | 3/1980 | Curran | 264/478 |
| 4,296,582 | 10/1981 | Simpson et al. . | |
| 4,677,014 | 6/1987 | Bechen . | |
| 4,774,295 | 9/1988 | Buding et al. . | |
| 5,086,121 | 2/1992 | Hazelton et al. | 525/197 |

FOREIGN PATENT DOCUMENTS

| | | |
|---|---|---|
| 0185152 | 6/1986 | European Pat. Off. . |
| 0394587 | 10/1990 | European Pat. Off. . |
| 2161573 | 7/1973 | France . |
| 2520830 | 8/1983 | France . |
| 2654931 | 6/1977 | Germany . |
| 2753340 | 5/1979 | Germany . |
| 60-161119 | 8/1985 | Japan ................................. 264/494 |
| 4238232 | 8/1992 | Japan . |
| 8003671 | 2/1981 | Netherlands ......................... 264/488 |
| 2163170 | 2/1986 | United Kingdom . |
| WO9302295 | 2/1993 | WIPO . |

Primary Examiner—Catherine Timm
Attorney, Agent, or Firm—Daniel J. Hulseberg; Michael O. Warnecke; Mayer, Brown & Platt

[57] ABSTRACT

The invention relates to a method of manufacturing a seal for a roller bearing, for instance a ball bearing. The seal according to the invention is formed from a thermoplastic polymer-containing material which is subsequently cross-linked under the influence of radiation, for example β-radiation. This allows the use of seals manufactured according to the invention at near or even above the melting point of the non-cross-linked thermoplastic polymer being employed. Due to the invention a large number of cheap polymeric materials have become suitable for the manufacture of seals, and due to the cross-linking the swelling caused by lubricants can be reduced considerably.

12 Claims, 1 Drawing Sheet

METHOD OF MANUFACTURING A SEAL FOR A ROLLER BEARING

The present invention relates to a method of manufacturing a seal for a roller bearing whereby a seal is formed from polymer-containing material and the material is subsequently cross-linked.

Such a method is known generally in the prior art. It is for instance known to manufacture seals from thermosetting rubber materials that are cross-linked by vulcanization.

The present invention aims to increase the number of polymer materials that can be used, especially at higher temperatures.

To this end the method according to the invention is characterized in that the polymer-containing material used is thermoplastic polymer-containing material which is cross-linked under the influence of radiation. This cross-linking changes the physical properties, strongly reducing swelling which occurs under the influence of lubricants.

As a result a seal can be manufactured in a simple and effective manner, formed from thermoplastic polymer-containing materials, whereby cross-linking under the influence of radiation adapts the properties of the material such that the seal is better suited for use near or above melting point of the thermoplastic polymer. A seal formed from thermoplastic polymer-containing material cross-linked by radiation will during use in a roller bearing near or above the melting point of the original thermoplastic polymer retain its form and will only show mechanical wear.

A preferred embodiment of the method uses ionizing radiation and in particular β-radiation.

This is an effective manner to bring about cross-linking of the polymer material.

Cross-linking the various parts of the pre-formed seal to a different degree can be advantageously carried out by adapting the radiation intensity and/or duration.

By cross-linking the different parts of the preformed seal to a different degree their properties, such as rigidity, are adapted to the function of the particular part. When manufacturing a seal having a sealing, elastic part and a form-retaining part, cross-linking thus promotes good adherence between the respective parts.

It is possible to manufacture the seal by means of injection molding. This allows the seals according to the invention to be manufactured economically.

In an advantageous embodiment the method is characterized in that injection molding is carried out in one single step.

Seals according to the invention can be manufactured by injection molding in one single step achieving very good bonding between a sealing, elastic part and a form-retaining part of the seal.

One preferred embodiment of the method according to the invention is characterized in that the same polymer-containing material is used for a seal having a sealing, elastic part and a form-retaining part.

This contributes to an optimal bond between the sealing, elastic and the form-retaining parts of the seal.

According to another very advantageous development the form-retaining part is at the same time formed by a cage or cage part. Such an embodiment contributes to the simpler assembly of a roller bearing formed with the seal. Moreover, because of less wear the operational life is longer and the sealing better.

Another embodiment of the method is characterized in that additives, in particular fibres are incorporated in the polymer-containing material.

By using additives the properties of the seals, in particular their different parts, are adapted to the functional demands of those different parts.

The fibres can advantageously be glass fibre or carbon fibre.

This allows especially the form-retaining part of the seal to be reinforced.

Another embodiment is characterized in that the additive is a plasticizer and/or an elastomeric material.

This makes it possible to confer especially on the sealing elastomeric part of the seal the desired elastomeric properties. Such additives can also promote cross-linking when using polymers that cross-link with difficulty.

The invention will now be elucidated with the aid of the drawing showing examples of embodiments of the invention.

Figure 1:
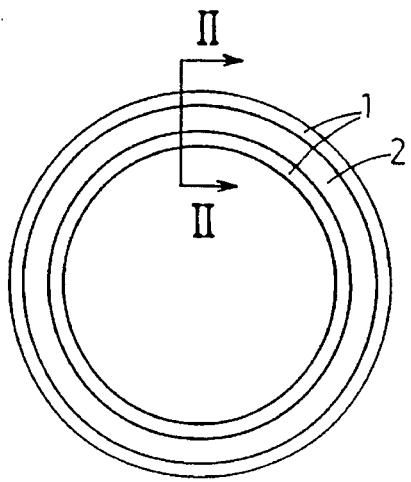
FIG. 1 is a very schematic view from above of a seal for a roller bearing.

FIG. 1 shows a seal for a roller bearing in which the reference number 1 indicates a sealing elastic part which prevents lubricant from being released from the roller bearing. The seal further comprises a form-retaining part 2. The rigidity of the form-retaining part 2 allows the elastic part 1 to effectively carry out its sealing function.

Figure 2:
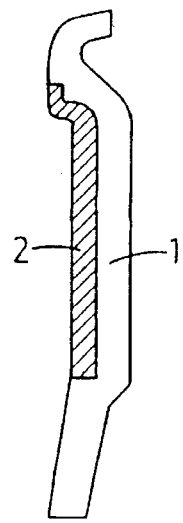
FIG. 2 is a cross section along the lines II—II as shown in FIG. 1 of a seal for a roller bearing according to the prior art.

In the cross section of a seal according to the prior art as shown in FIG. 2, the elastic part 1 is an elastomer and the form-retaining part 2 is an inserted metal piece. A disadvantage when using thermoplastic elastomers is hereby the poor bonding between the two parts. Also, as the seal consists of two parts, its manufacture is rendered more difficult.

Figure 3:
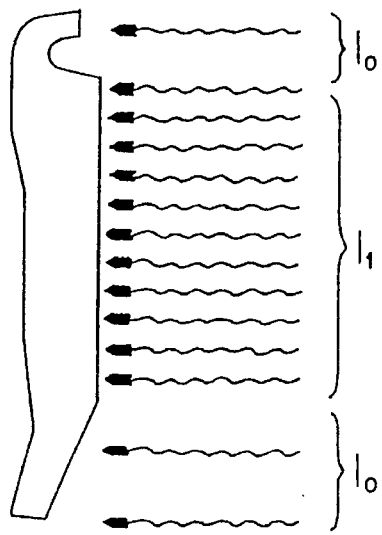
FIG. 3 is a schematic illustration of a step in the manufacturing process of a seal.
Figure 4:
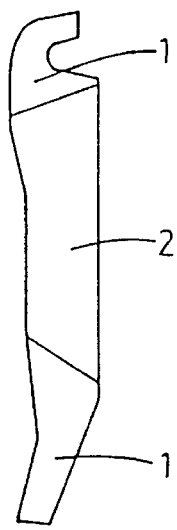
FIG. 4 is a cross-section corresponding to FIG. 2 of a seal according to the invention.

According to the invention a seal for a roller bearing can be manufactured by cross-linking a thermoplastic polymer-containing material by radiation. Examples of such thermoplastic elastomers are polypropylene, polyethylene, etc. these polymers are also cheap. They can be cross-linked to various degrees, depending on the function of the different seal parts for a roller bearing. A greater degree of cross-linking means greater rigidity. In order to cross-link different seal parts to different degrees the radiation intensity can be adjusted. This is indicated in FIG. 3 with arrows, whereby the intensity $I_0$ is lower than $I_1$. Instead of adjusting the radiation intensity, the duration of radiation for the parts having a sealing function can be shortened in relation to the duration of radiation for the form-retaining parts. Naturally, a combination of adjusting the radiation intensity and the length of radiation time also belongs to the possibilities. The elastic character of the polymer-containing material, possibly provided with plasticizer or elastomer, will be retained at least to some degree, while the form-retaining part 2 is more rigid than the sealing, elastic part 1, because of a higher degree of cross-linking. In this manner the seal according to the invention as shown in FIG. 4 is formed. When injection molding the seal, whereby the sealing part 1 and the form-retaining part 2 are formed in separate steps, and in the case that said parts consist of different materials, the sealing elastic part 1 is strongly bonded with the form-retaining part 2. The properties of the material can be further adapted by using additives such as fibre. This can increase the rigidity of the form-retaining part 2 as well as the bond between parts 1 and 2. The fibre can, among others, be glass fibre or carbon fibre. If the polymer used cross-links with difficulty, as is the case with polyamide, then the use of cross-linkable additives is desirable. Examples of such additives are cross-linkable polymers, such as for instance polyethylene.

Figure 5:
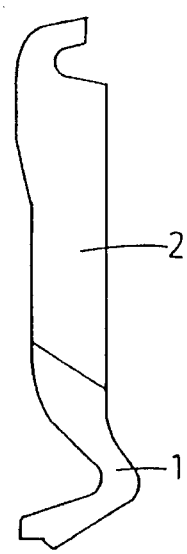
FIG. 5 and FIG. 6 represent, in a similar way as FIG. 2, embodiments of seals according to the invention.
Figure 6:
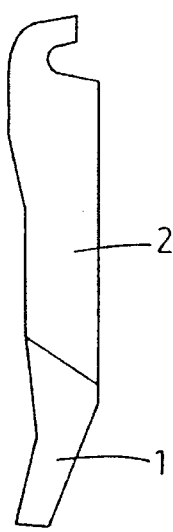

The embodiments of the seal for a roller bearing shown in FIG. 5 relate to a seal which is especially suitable for use when the sealing part is in axial contact with the inner race ring of the roller bearing rotating in relation to the seal, while the variant shown in FIG. 6 is a seal according to the invention for use when the sealing part is in radial contact with said inner ring.

The invention also relates to the manufacture of a seal whereby the form-retaining part is formed by a cage or cage part or is formed thereon. To avoid damage, for instance microcracks, of the cage or the cage part, the cage or cage part is built into the roller bearing before cross-linking.

Figure 7:
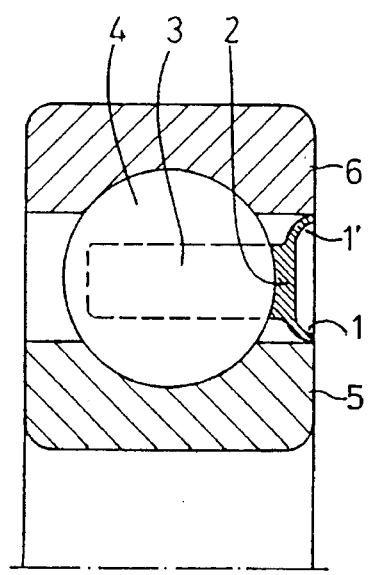
FIG. 7 represents an axial cross section of a roller bearing according to the invention.

FIG. 7 shows an axial cross section of part of a roller bearing. The form-retaining part 2 of the seal shown here is provided with cage parts 3 in which balls 4 are incorporated. In the embodiment represented here the sealing, elastic parts 1, 1' seal on to the smooth sides of the inner race ring 5 and outer race ring 6 respectively. In such an embodiment the sealing, elastic parts are less liable to wear because of a relative lower velocity in respect to the inner and outer race ring. At the same time the manufacture of such a roller bearing is simple and cheap, because there is no necessity for special grooves and notches. Naturally the side shown in FIG. 7 without a seal can also be provided with a seal that is or is not connected to the cage parts.

We claim:

1. A method of manufacturing a seal for a roller bearing comprising the steps of:

forming a component configured as a seal for a roller bearing, the component being formed from thermoplastic polymer-containing material so as to include a sealing portion and a base portion; and irradiating the component with radiation to cross-link the thermoplastic polymer-containing material, irradiation by the irradiating step being varied across the component to cross-link the base portion to a different degree than the sealing portion such that the base portion forms a form-retaining part and the sealing portion forms a sealing, elastic part.

2. A method according to claim 1, wherein the radiation of the irradiating step is ionizing radiation.

3. A method according to claim 2, wherein the ionizing radiation is β-radiation.

4. A method according to claim 1, wherein irradiation by the irradiating step is varied across the component to cross-link the base portion more than the sealing portion by adapting at least one of the intensity and duration of the radiation.

5. A method according to claim 1, wherein the component is formed by injection molding.

6. A method according to claim 5, wherein the injection molding is performed in a single step.

7. A method according to claim 1, wherein the sealing portion and the base portion of the component are formed of the same thermoplastic polymer-containing material to respectively form the sealing, elastic part and the form-retaining part.

8. A method according to claim 7, wherein the component is formed such that the form-retaining part includes at least a portion of a cage for the bearing.

9. A method according to claim 1 further including the step of incorporating an additive in the thermoplastic polymer-containing material prior to the irradiating step.

10. A method according to claim 9, wherein the additive incorporated is fibre.

11. A method according to claim 10, wherein the fibre is selected from a group consisting of glass fibre and carbon fibre.

12. A method according to claim 9, wherein the additive incorporated is selected from a group consisting of plasticizer and elastomeric material.

* * * * *